US012697771B2

(12) United States Patent
Thomas et al.

(10) Patent No.: US 12,697,771 B2
(45) Date of Patent: Aug. 4, 2026

(54) ULTRAVIOLET FUSING AGENTS FOR COLORLESS THREE DIMENSIONAL PRINTED PARTS

(71) Applicant: PERIDOT PRINT LLC, Palo Alto, CA (US)

(72) Inventors: Jake H. Thomas, San Diego, CA (US); Emily Levin, San Diego, CA (US); Emre Hiro Discekici, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 77 days.

(21) Appl. No.: 18/728,756

(22) PCT Filed: Jan. 19, 2022

(86) PCT No.: PCT/US2022/012887
§ 371 (c)(1),
(2) Date: Jul. 12, 2024

(87) PCT Pub. No.: WO2023/140832
PCT Pub. Date: Jul. 27, 2023

(65) Prior Publication Data
US 2025/0100214 A1 Mar. 27, 2025

(51) Int. Cl.
| | |
|---|---|
| *B29C 64/165* | (2017.01) |
| *B29C 64/264* | (2017.01) |
| *B33Y 10/00* | (2015.01) |
| *B33Y 30/00* | (2015.01) |
| *B33Y 70/00* | (2020.01) |
| *C08K 5/3475* | (2006.01) |
| *B29K 77/00* | (2006.01) |

(52) U.S. Cl.
CPC .......... *B29C 64/165* (2017.08); *B29C 64/264* (2017.08); *B33Y 10/00* (2014.12); *B33Y 30/00* (2014.12); *B33Y 70/00* (2014.12); *C08K 5/3475* (2013.01); *B29K 2077/00* (2013.01)

(58) Field of Classification Search
None
See application file for complete search history.

(56) References Cited

U.S. PATENT DOCUMENTS

| | | | |
|---|---|---|---|
| 7,026,368 | B2 | 4/2006 | Yamada et al. |
| 7,141,104 | B2 | 11/2006 | De Voeght et al. |
| | | (Continued) | |

FOREIGN PATENT DOCUMENTS

| | | | | |
|---|---|---|---|---|
| CN | 115379942 | B * | 2/2026 | ........... B29C 64/165 |
| WO | 2020/190334 | A1 | 9/2020 | |
| | | (Continued) | | |

*Primary Examiner* — Sanza L. McClendon
(74) *Attorney, Agent, or Firm* — Dierker & Kavanaugh, P.C.

(57) ABSTRACT

In example implementations, a three-dimensional printing kit for printing a colorless three-dimensional object in a three-dimensional printing system is provided. The three-dimensional printing kit includes a build material and an ultraviolet (UV) fusing agent. The UV fusing agent includes water, a UV light absorber, about 10-50 weight percent (wt %) of a first solvent to provide a polymer plasticizer, and about 30-50 wt % a second solvent that is water miscible and dissolves the UV light absorber.

15 Claims, 4 Drawing Sheets

(56)         References Cited

U.S. PATENT DOCUMENTS

| 10,052,861  | B2  |    | 8/2018 | Wang et al. |
| 12,570,048  | B2 * | | 3/2026 | Harvey ................. B29C 64/188 |
| 2011/0061566 | A1 | | 3/2011 | Banning et al. |
| 2019/0240901 | A1 | | 8/2019 | Jansen et al. |
| 2021/0024775 | A1 | | 1/2021 | Rolland et al. |
| 2025/0162245 | A1 * | | 5/2025 | Discekici .............. B33Y 30/00 |

FOREIGN PATENT DOCUMENTS

| WO | 2020/251661 | A1 |   | 12/2020 | |
| WO | 2021/071514 | A1 |   | 4/2021 | |
| WO | 2021/118554 | A1 |   | 6/2021 | |
| WO | 2021/175886 | A1 |   | 9/2021 | |
| WO | WO-2026043473 | A1 | * | 2/2026 | ............. B33Y 10/00 |

* cited by examiner

100

110  120

200

210

220

222

224

226

228

300

400

500

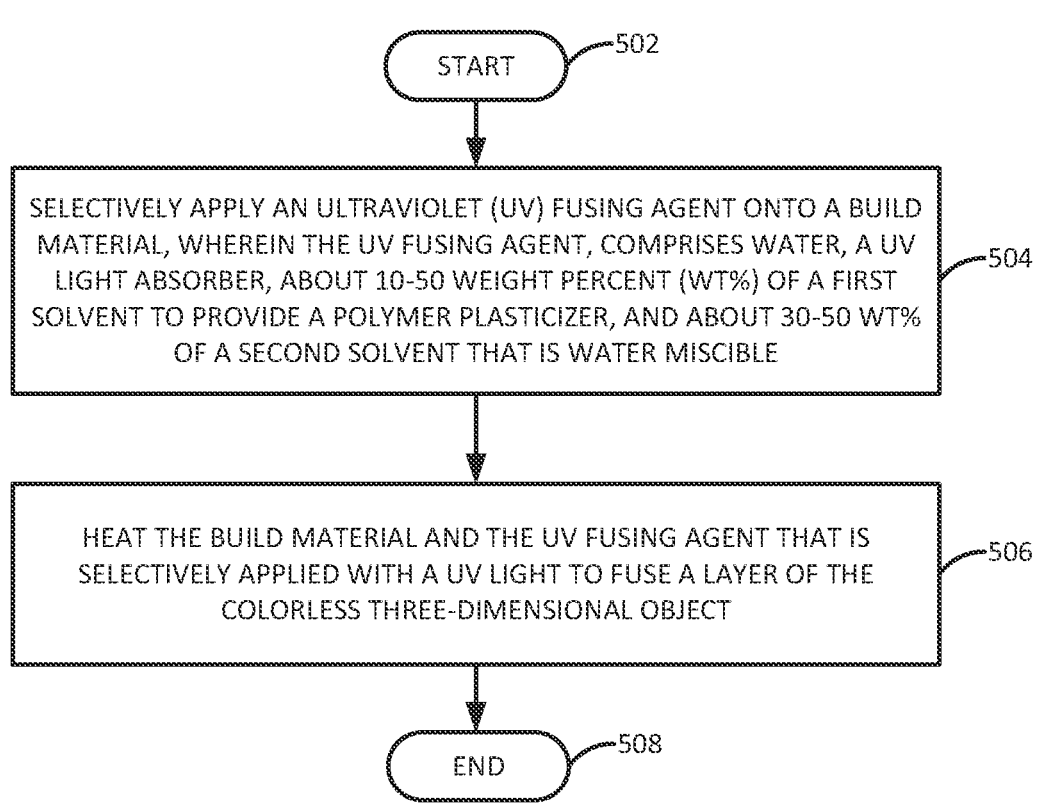

START —502

SELECTIVELY APPLY AN ULTRAVIOLET (UV) FUSING AGENT ONTO A BUILD MATERIAL, WHEREIN THE UV FUSING AGENT, COMPRISES WATER, A UV LIGHT ABSORBER, ABOUT 10-50 WEIGHT PERCENT (WT%) OF A FIRST SOLVENT TO PROVIDE A POLYMER PLASTICIZER, AND ABOUT 30-50 WT% OF A SECOND SOLVENT THAT IS WATER MISCIBLE —504

HEAT THE BUILD MATERIAL AND THE UV FUSING AGENT THAT IS SELECTIVELY APPLIED WITH A UV LIGHT TO FUSE A LAYER OF THE COLORLESS THREE-DIMENSIONAL OBJECT —506

END —508

ULTRAVIOLET FUSING AGENTS FOR COLORLESS THREE DIMENSIONAL PRINTED PARTS

BACKGROUND

Three-dimensional (3D) printing may include an additive printing process used to make three-dimensional solid parts from a digital model. 3D printing can be often used in rapid product prototyping, mold generation, mold master generation, and short run manufacturing. Some 3D printing techniques are considered additive processes because they involve the application of successive layers of material. This is unlike customary machining processes, which often rely upon the removal of material to create the final part. 3D printing can often use curing or fusing of the build material, which for some materials may be accomplished using heat-assisted extrusion, melting, or sintering.

BRIEF DESCRIPTION OF THE DRAWINGS

FIG. 5 is a flowchart illustrating an example method of selectively applying the three-dimensional printing kit of the present disclosure on a build material to print a three-dimensional object;

DETAILED DESCRIPTION

Examples described herein provide ultraviolet (UV) fusing agents for colorless three dimensional (3D) printed parts. As discussed above, 3D printing may include an additive printing process that is used to make 3D solid parts from a digital model. 3D printing includes adding layers of build material. Layers of each object are "printed" in the build material with a fusing agent. The fusing agent absorbs light energy and converts the light energy into heat to heat a build material to a melting temperature of the build material. The build material can then be fused back together as the build material re-solidifies.

Some printing technologies, such as selective laser sintering (SLS) or multi-jet fusion (MJF) 3D printing, may print 3D parts using various build materials and fusing agents. These technologies use a tungsten bronze low tint fusing agent (LTFA) that is fused with an ultraviolet or near infrared emitting light source. However, these LTFAs can include cesium tungsten oxide which carries a blue tint. To get white or off-white parts, a whitener can be added to the material. Thus, printing truly colorless parts can be impossible using LTFAs.

MJF 3D printing uses fusing agents. Currently, there are no available white or clear fusing agents. Thus, there are no currently available methods to print white or clear parts without using a whitener, as described above.

Printing truly colorless parts would enable printing of colored parts with a greater color gamut than when printed with LTFA. In addition, printing truly colorless parts may increase recyclability. Although 3D printed parts containing carbon black may be recyclable, the rate at which the part can be recycled is reportedly low since the carbon black may inevitably tint any recycled materials derived from the 3D printed part containing carbon black.

The present disclosure provides a UV fusing agent that is free of colored pigments or dyes, or cesium tungsten oxide found in the LTFAs, that can be used to print truly colorless parts. The UV fusing agent of the present disclosure can also be formulated to lower the melting temperature of the build material, which can allow for lower energy usage when printing the 3D part.

In addition, the UV fusing agent of the present disclosure can fully solubilize the UV light absorber such that the UV fusing agent is free from particles that could potentially clog nozzles. The vehicle formulation of the UV fusing agent of the present disclosure can keep the UV light absorber solubilized, providing a UV fusing agent that is stable over time.

Figures 1, 2:
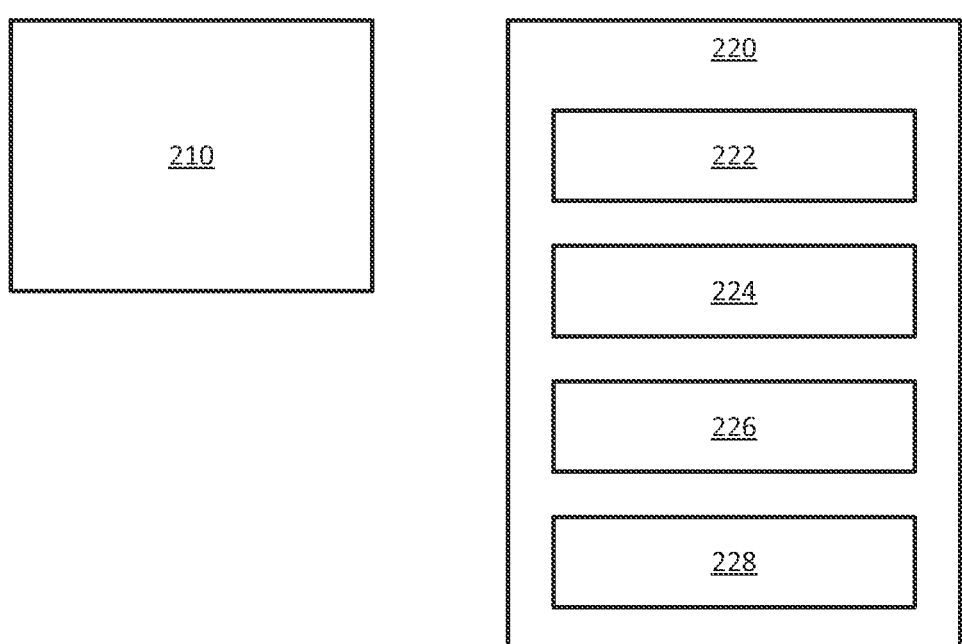
FIG. 1 is a block diagram of an example three-dimensional printing kit in accordance with the present disclosure.
FIG. 2 is a block diagram of another example three-dimensional printing kit in accordance with the present disclosure.

FIG. 1 illustrates a schematic illustration of an example three-dimensional printing kit 100 of the present disclosure. Three-dimensional printing kits can be used to make three-dimensional printed objects. A certain three-dimensional printing, or additive manufacturing, process can be performed using the materials described herein. In an example, UV fusing agents can be selectively applied to bounded portions within the layers of the build material. Successive layers of the build material can be added.

In an example, the three-dimensional printing kit 100 of the present disclosure may include a build material 110 and a UV fusing agent 120. The build material 110 may be a powder, a liquid, a paste, a gel, and the like. In an example, the build material 110 may be a polymer powder. Example build materials may include polyamides, modified polyamides, polyethylene, polyethylene terephthalate (PET), and amorphous variations of these materials. Other example build materials include polystyrene, polyacetals, polypropylene, polycarbonate, polyester, polyurethanes, other engineering plastics, and blends of any two or more of the polymers listed herein.

In an example, when the build material is in a powder form, the build material may be made up of similarly sized particles or differently sized particles. Size, as used herein, refers to the diameter of a spherical particle, or the average diameter of a non-spherical particle. In some examples, the average size of the particles of the build material in the build material composition ranges from about 10 micrometer ($\mu$m) to about 100 $\mu$m or about 40 $\mu$m to about 50 $\mu$m. In some examples, the diameter or average diameter of the particles may be measured using an analytical chemical analysis. For example, the average diameter of the particles may be measured using a volume-based size distribution. The size of the particles may be measured by using a static light scattering technique, such as laser diffraction.

In an example, the UV fusing agent 120 may include a UV light absorber that absorbs UV light. The UV light may have a wavelength between 320 nanometers (nm) to 400 nm. In an example, the UV wavelength of light may be approximately 365 nm. FIG. 2 illustrates different formulations of the UV fusing agent 120.

FIG. 2 illustrates a schematic illustration of another example three-dimensional printing kit 200 of the present disclosure. In an example, three-dimensional printing kit 200 may include a build material 210 and a UV fusing agent 220.

In an example, the build material 210 may be similar to the build material 110 illustrated in FIG. 1 and described above. In an example, the build material 210 may be a polymer powder.

In an example, the UV fusing agent 220 may include water 222 (e.g., deionized water), a UV light absorber 224, a first solvent 226 to provide a polymer plasticizer, and a second solvent 228 that is water miscible. The UV light absorber 224 may be any type of absorber that can absorb light having wavelengths between 320 nm to 400 nm. In an example, the UV light absorber 224 may be a substituted cresol. In an example, the UV light absorber may be 2-(2H-benzotrizol-2-yl)-6-dodecyl-4methyl-phenol, also known by the trade name Tinogard TL.

Many of the UV light absorbers are hydrophobic by nature, which presents challenges when formulating the UV light absorber 224 into an aqueous ink. The term "aqueous" may be defined as containing 10% or more of water for nucleation in a thermal inkjet process. One approach is to prepare a dispersion of the UV light absorber 224 using surfactants in a polar medium such as water. However, dispersions can include particles that can grow or aggregate over time, creating clogging issues in the print nozzles.

An alternate approach, described herein, is to use appropriate solvents with sufficient amphiphilic character to interact with both the water 222 and the UV light absorber 224. In the present disclosure, one of the solvents may serve a function of plasticization of the build material to lower a melting temperature of the build material, and another solvent may act as a good solvent for both water 222 and the UV light absorber 224.

In an example, the first solvent 226 may be a plasticizer and/or may have plasticizing characteristics when interacting with the build material 210. For example, the first solvent 226 may interact with the build material 210 to lower the melting temperature of the build material 210. As a result, less UV light absorber 224 may be used and less energy may be used to melt the build material 210.

The second solvent 228 may be a water miscible solvent that is compatible with the UV light absorber 224. The second solvent 228 may help keep the UV light absorber dissolved in the water 222 and may help provide stability and prevent precipitation of the UV light absorber 224 over time. In other words, the UV light absorber 224 is solubilized in the first solvent 226 and the second solvent 228 and not a dispersion.

In an example, the first solvent 226 and the second solvent 228 may be different co-solvents. For example, the first solvent 226 may be an organic solvent, such as benzyl alcohol. The second solvent 228 may include at least one of diethylene glycol (DEG) butyl ether, 1,2-hexanediol, hydroxyethyl-2-pyrrolidone (HE2P), propylene glycol, or 1,5-pentane diol.

In another example, certain types of solvents may be able to act as the plasticizer and be water miscible to solubilize the UV light absorber 224. Thus, the first solvent 226 and the second solvent 228 may be the same solvent. Said another way, a single solvent may be used to perform the functions of the first solvent 226 and the second solvent 228. An example of a solvent that may perform the functions of both the first solvent 226 and the second solvent 228 may include DEG butyl ether.

In an example, the UV fusing agent 220 may include additional compounds. For example, the UV fusing agent 220 may also include a surfactant for jettability and an additional solubilizer. An example of the surfactant may include Tergitol 15-S-9. An example of the additional solubilizer may include Kolliphor RH40, BRIJ L23, and the like.

In an example, the formulation of the UV fusing agent 220 may include 8-30 wt % of the water 222. In an example, the UV fusing agent 220 may include 10-25 wt % of the water 222. In an example, the UV fusing agent 220 may include approximately 19 wt % of the water 222.

In an example, the formulation of the UV fusing agent 220 may include 0.3-5 wt % of the UV light absorber 224. In an example, the UV fusing agent 220 may include 1 to 3 wt % of the UV light absorber 224. In an example, the UV fusing agent 220 may include approximately 2 wt % of the UV light absorber 224.

In an example, the formulation of the UV fusing agent 220 may include 10-50 wt % of the first solvent 226. In an example, the UV fusing agent 220 may include between 20-40 wt % of the first solvent 226. In an example, the UV fusing agent 220 may include approximately 34 wt % of the first solvent 226.

In an example, the formulation of the UV fusing agent 220 may include 30-50 wt % of the second solvent 228. In an example, the UV fusing agent 220 may include between 35 to 45 wt % of the second solvent 228. In an example, the UV fusing agent 220 may include approximately 41 wt % of the second solvent 228.

In an example, the formulation of the UV fusing agent 220 may include between 0.1 to 1 wt % of the surfactant. In an example, the UV fusing agent 220 may include approximately 0.75 wt % of the surfactant.

In an example, the formulation of the UV fusing agent 220 may include between 1-3 wt % of the additional solubilizer. In an example, the formulation of the UV fusing agent 220 may include approximately 3 wt % of the additional solubilizer/crystallization inhibitor.

An example formulation of the UV fusing agent 220 is provided below.

Example 1

| Component | wt % |
| --- | --- |
| Benzyl alcohol | 34.0 |
| DEG butyl ether | 41.0 |
| Tinogard TL | 2.0 |
| Tergitol 15-S-9 | 0.75 |
| Kolliphor RH40 | 3 |
| Water | 19.3 |

In an example, the benzyl alcohol serves the function as the plasticizer, which facilitates a more complete fusing event. The plasticizing effects of the first solvent (e.g., benzyl alcohol in the present example) on different build materials are illustrated in FIG. 6 and FIG. 7.

Figure 6:
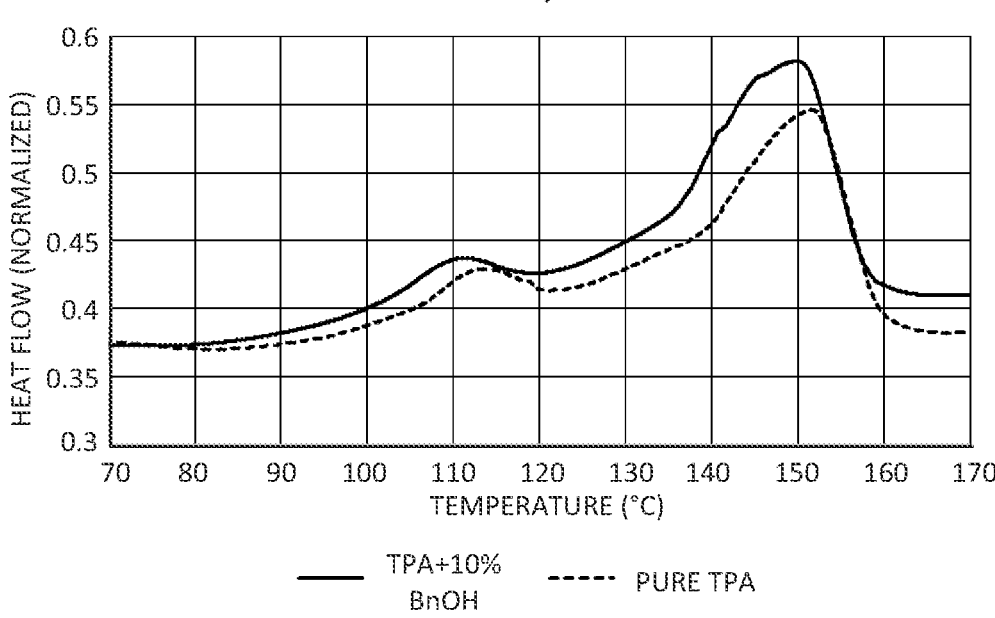
FIG. 6 illustrates a chart showing how a solvent that acts as a plasticizer can lower a melting temperature of a first type of build material.

FIG. 6 illustrates a graph 600 that illustrates the effect of benzyl alcohol on thermoplastic polyamides (TPA). As shown in FIG. 6, a physical blend of TPA powder with 10% benzyl alcohol shows a broadening of melt transition and a shift towards lower temperatures when compared against pure TPA. For example, the TPA with the benzyl alcohol begins melting around 150 degrees Celsius versus around 155 degrees for pure TPA.

Figure 7:
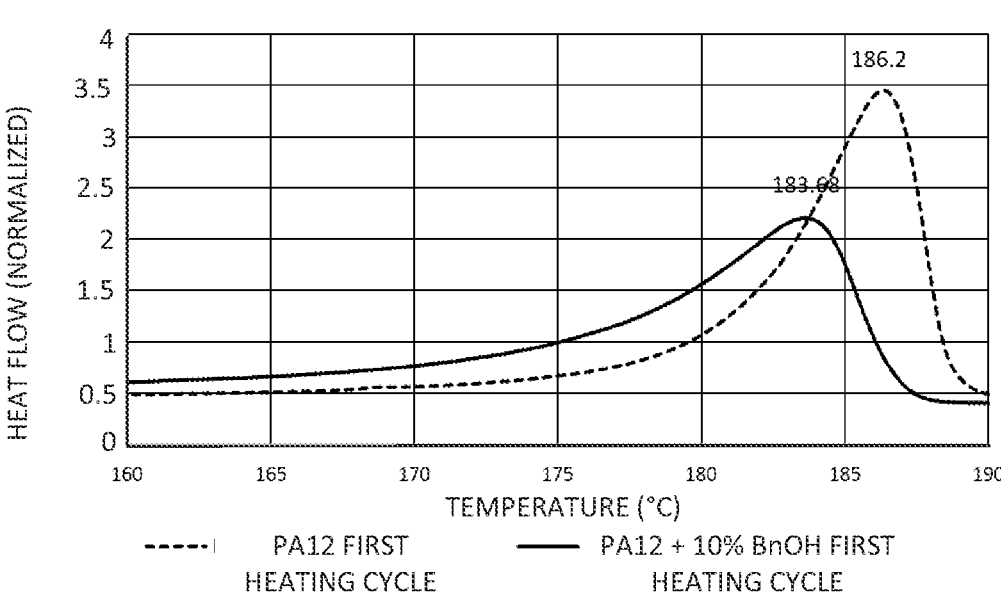
FIG. 7 illustrates a chart showing how a solvent that acts as a plasticizer can lower a melting temperature of a second type of build material.

FIG. 7 illustrates a graph 700 that illustrates the effect of benzyl alcohol on polyamides 12 (PA12). As shown in FIG. 7, a physical blend of PA12 powder with 10% benzyl alcohol shows a broadening of melt transition and a shift towards lower temperatures when compared against pure PA12. For example, the PA12 with the benzyl alcohol begins melting around 183 degrees Celsius versus around 186 degrees for pure TPA. Thus, the graphs 600 and 700 suggest that the during the fuse event in the MJF process, inter-particle coalescence in the presence of benzyl alcohol begins at lower temperatures and progresses over a broader temperature range.

Figure 3:
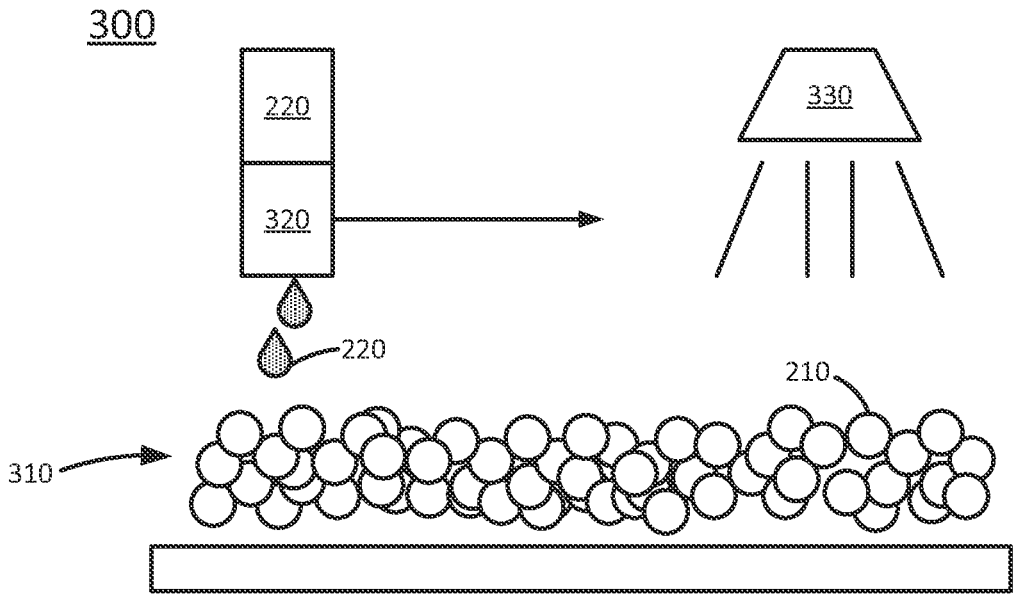
FIG. 3 is a schematic illustration of an example three-dimensional printing system that uses the three-dimensional printing kit of the present disclosure.

FIG. 3 illustrates an example of a three-dimensional printing system 300 that can use the three-dimensional printing kit 100 or 200 described above. The three-dimensional printing system 300 can be used with three-dimensional printing kit 100 or 200 described herein to make three-dimensional printed objects. In some examples, a three-dimensional printing system can include a powder bed 310 for holding layers of the build material 110 or 210. A fusing agent applicator 320 can be positioned to selectively apply the UV fusing agent 120 or 220 onto the layers of build material 110 or 210. For example, the UV fusing agent applicator 320 can be controllable to apply the colorless fusing agents at specific x/y coordinates of the layer of build material 110 or 210. Additionally, the three-dimensional printing system can include a fusing lamp. As used herein, "fusing" can refer to a process of heating the build material 110 or 210 and the UV fusing agents 120 or 220 so that build material is melted and then allowed to fuse back together when cooled.

In an example, the three-dimensional printing system 300 may include a powder bed 310. The example powder bed 310 illustrated in FIG. 3 uses the build material 210 and the UV fusing agent 220. However, it should be noted that the three-dimensional printing system 300 may also use the build material 110 and the UV fusing agent 120.

In an example, the powder bed 310 includes a layer of build material 210. As noted above, the build material 210 includes particles of a polymer. The printing system 300 may also include a UV fusing agent applicator 320. The fusing agent applicator 320 is fluidly coupled to a UV fusing agent 220. The fusing agent applicator 320 can be controlled to iteratively apply the UV fusing agent 220 on desired locations of layers of the build material 210.

The printing system 300 may also include a fusing lamp 330 positioned to emit wavelengths of light to be absorbed by the UV fusing agent 220. The fusing lamp 330 may emit light having a UV wavelength (e.g., between 320 nm to 400 nm). In an example, the fusing lamp 330 may emit light having a wavelength of approximately 365 nm. The absorbed light can be converted into heat to melt the particles of the build material 210. Although the fusing lamp 330 is illustrated above the powder bed 310, it should be noted that the fusing lamp 330 may also be positioned below the powder bed 310.

In some examples, a detailing agent may also be used. Multi-jet fusion employs the detailing agent as a cooling agent that is applied to certain regions of the build to control thermals in the build bucket. The detailing agent is often printed in regions just superficial to the boundary of the part to prevent over fusing of surrounding powder onto the part edges. The detailing agent can also be applied within the body of large and bulky volumes within parts to prevent over temperature defects which can arise from excessive temperatures.

It should be noted that the three-dimensional printing system 300 has been simplified for ease of explanation and can include a variety of additional components in addition to the components shown in FIG. 3. Examples of additional components include a build material distributor, a supply of additional build material, a fluid applicator for applying a binding agent, a hardware controller to send instructions to other components in the system, a non-transitory computer readable medium having stored computer executable instructions to cause the hardware controller to send instructions to other components of the system to perform a three-dimensional printing method, a sintering oven, and the like.

Figure 4:
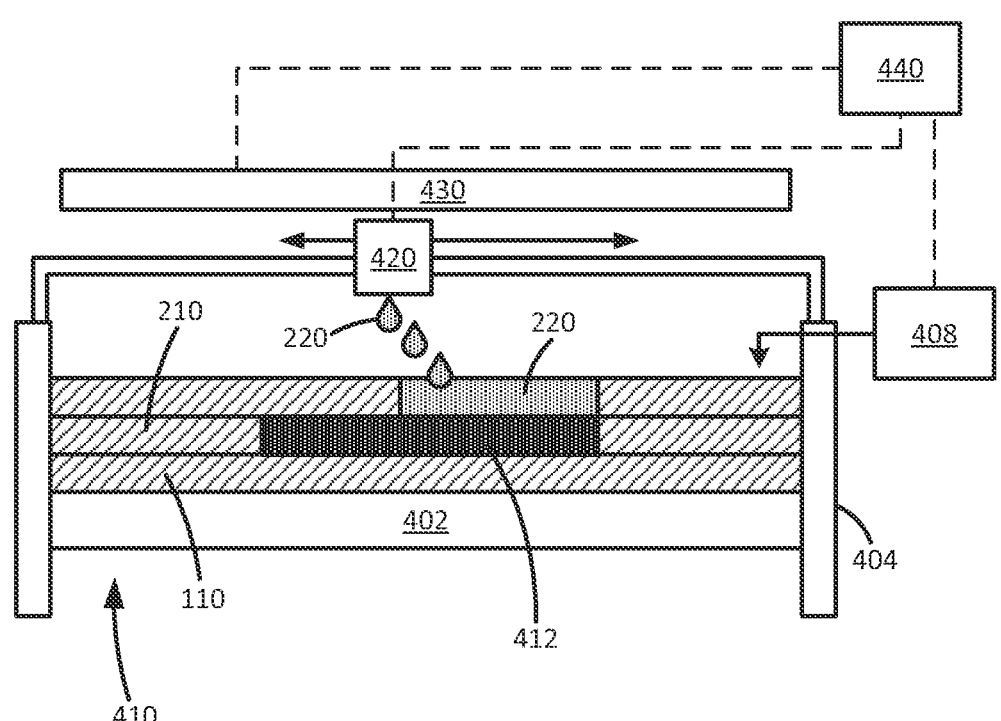
FIG. 4 is a schematic illustration of another example three-dimensional printing system that uses the three-dimensional printing kit of the present disclosure.

FIG. 4 illustrates another example three-dimensional printing system 400. The example printing system 400 illustrated in FIG. 4 uses the build material 210 and the UV fusing agent 220. However, the printing system 400 may also use the build material 110 and the UV fusing agent 120.

In an example, the printing system 400 includes a powder bed 410 having a build material platform 402 and side walls 404. A build material applicator 408 is configured to deposit individual layers of the build material 210.

The printing system 400 may also include a fusing agent applicator 420 that is positioned above the powder bed 410. The fusing agent applicator 420 may be moveable so that the fusing agent applicator 420 can apply the UV fusing agent 220 on to the layers of the build material 210.

A fusing lamp 430 may be positioned to emit wavelengths of light that are absorbed by the UV fusing agent 220. The absorbed light can be converted into heat to heat the powder bed 410. In this example, the fusing lamp 430 may heat the individual layers of the build material 210 after the UV fusing agent 220 is applied to selective areas of a layer of the build material 210. The 3D object may be completed by building successive layers that are melted and fused layer by layer.

The printing system 400 may also include a hardware controller 440 or processor. The hardware controller 440 may communicate with the fusing lamp 430, the fusing agent applicator 420, and the build material applicator 408 to send instructions to the fusing lamp 430, the UV fusing agent applicator 420, and the build material applicator 408 to perform a three-dimensional printing method (e.g., the method 500 illustrated in FIG. 5, and described below).

In some examples, the fusing agent applicator 420 can be moveable along two axes, such as an x-axis and a y-axis, to allow the UV fusing agent 220 to be selectively applied to any desired location on the layers of build material 210. In other examples, the fusing agent applicator 420 can be large enough to extend across one entire dimension of the powder bed 410, and the fusing agent applicator 420 can be moveable along one axis.

For example, the UV fusing agent applicator 420 can include a plurality of nozzles along the length of the fusing agent applicator 420, and the UV fusing agent 220 can be selectively jetted from the individual nozzles. The fusing agent applicator 420 can then scan across the powder bed 410, and the UV fusing agent 220 can be selectively jetted from the nozzles to allow the UV fusing agent 220 to be applied to any desired location on the powder bed 410.

In other examples, the powder bed 410 itself can be moveable. For example, the powder bed 410 can be moveable and the fusing agent applicator 420 can be stationary. In either example, the fusing agent applicator 420 and the powder bed 410 can be configured so that the UV fusing agent 220 can be selectively applied to specific portions of the powder bed 410.

The fusing agent applicator 420 can be configured to print drops of the UV fusing agent 220 at a resolution ranging from about 300 dots per inch (DPI) to about 1200 DPI in some examples. Higher resolutions or lower resolutions can also be used. The volume of individual drops of UV fusing agent 220 can be from about 1 Pico liters (pL) to about 400 pL in some examples. The firing frequency of nozzles of the fusing agent applicator 420 can be from about 1 kilohertz (kHz) to about 100 kHz in certain examples.

FIG. 5 illustrates a flow diagram of an example method 500 for selectively applying the three-dimensional printing kit on a build material to print a three-dimensional object of the present disclosure. In an example, the method 500 may be performed by the printing system 300 illustrated in FIG. 3 or the printing system 400 illustrated in FIG. 4 using the three-dimensional printing kit 100 illustrated in FIG. 1 or the three-dimensional printing kit 200 illustrated in FIG. 2.

At block 502, the method 500 begins. At block 504, the method 500 selectively applies an ultraviolet (UV) fusing agent onto a build material, wherein the UV fusing agent comprises water, a UV light absorber, about 10-50 weight percent (wt %) of a first solvent to provide a polymer plasticizer, and about 30-50 wt % of a second solvent that is water miscible. For example, a layer of the build material may be deposited onto a powder bed. The build material may be leveled to provide a smooth, even layer of the build material.

In an example, the UV light absorber may be a substituted cresol. An example of the substituted cresol may include a colorless UV absorber that is soluble in the ink vehicles described herein, such as Tinogard TL. The UV fusing agent may include 0.3-5 wt % of the UV light absorber.

In an example, the first solvent and the second solvent may be different co-solvents. For example, the first solvent may be an organic solvent, such as benzyl alcohol. The second solvent may include at least one of diethylene glycol (DEG) butyl ether, 1,2-hexanediol, hydroxyethyl-2-pyrrolidone (HE2P), propylene glycol, or 1,5-pentane diol.

In another example, certain types of solvents may be able to act as the plasticizer and be water miscible to solubilize the UV light absorber. Thus, the first solvent and the second solvent may be the same solvent. Said another way, a single solvent may be used to perform the functions of the first solvent and the second solvent. An example of a solvent that may perform the functions of both the first solvent and the second solvent may include DEG butyl ether.

In an example, the UV fusing agent may also include 0.1 to 1 wt % of a surfactant and 1-3 wt % of an additional solubilizer. An example formulation of the UV fusing agent of the present disclosure is provided above in Example 1.

At block 506, the method 500 heats the build material and the UV fusing agent that is selectively applied with a UV light to fuse a layer of the colorless three-dimensional object. For example, a fusing lamp may emit UV wavelength of light that is absorbed by the UV fusing agent. For example, the UV wavelength of light may be between 320 nm to 400 nm. In an example, the fusing lamp may emit light at a wavelength of approximately 365 nm.

The UV fusing agent may convert the absorbed light energy into heat to heat the selected locations of the build material where the UV fusing agent is applied. The heat may locally melt the build material and allow the build material to fuse together when solidified.

As noted above, the first solvent may help to reduce the melting point of the build material. As a result, less UV absorber may be used in the UV fusing agent. In addition, the build material may be exposed to the fusing lamp for a shorter amount of time, thereby using less power. This may lead to lower costs (e.g., lower costs associated with less UV absorber consumed, less power consumed, and the like) and faster build times to print 3D parts with the UV fusing agent of the present disclosure.

The method 500 may repeat blocks 504 and 506 for multiple layers. Each layer may include a bound portion that forms a portion of the three-dimensional object that is to be printed. The method 500 may then sinter the layers of the three-dimensional object that are bound to form a sintered three-dimensional printed object or the final form of the three-dimensional printed object. At block 508, the method 500 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A three-dimensional printing kit, comprising:
   a build material; and
   an ultraviolet (UV) fusing agent, comprising:
   water;
   a UV light absorber that is a substituted cresol;
   10-50 weight percent (wt %) of a first solvent that is a plasticizing solvent; and
   30-50 wt % of a second solvent that is water miscible and dissolves the UV light absorber.

2. The three-dimensional printing kit of claim 1, wherein the first solvent and the second solvent are the same.

3. The three-dimensional printing kit of claim 1, wherein both of the first and second solvents are diethylene glycol (DEG) butyl ether.

4. The three-dimensional printing kit of claim 1, wherein the first solvent is benzyl alcohol.

5. The three-dimensional printing kit of claim 1, wherein the second solvent is selected from the group consisting of diethylene glycol (DEG) butyl ether, 1,2-hexanediol, hydroxyethyl-2-pyrrolidone (HE2P), propylene glycol, and 1,5-pentane diol.

6. The three-dimensional printing kit of claim 1, wherein the UV fusing agent comprises 0.3 to 5 weight percent of the UV light absorber.

7. The three-dimensional printing kit of claim 1, wherein the UV light absorber is 2-(2H-benzotrizol-2-yl)-6-dodecyl-4methyl-phenol.

8. The three-dimensional printing kit of claim 1, wherein the UV fusing agent further comprises:
   a surfactant; and
   a solubilizer.

9. A three-dimensional printing system, comprising:
   a powder bed comprising a layer of build material;
   a fusing agent applicator fluidly coupled to a supply of an ultraviolet (UV) fusing agent, wherein the fusing agent applicator is to iteratively apply the UV fusing agent to the layer of build material, wherein the UV fusing agent comprises water, a UV light absorber that is a substituted cresol, 10-50 weight percent (wt %) of a first solvent that is a plasticizing solvent, and 30-50 wt % of a second solvent that is water miscible and dissolves the UV light absorber; and
   a fusing lamp positioned to emit UV light to heat a portion of the powder bed that received the UV fusing agent to a fusing temperature.

10. The three-dimensional printing system of claim 9, wherein the UV light has a wavelength ranging from 320 nanometers (nm) to 400 nm.

11. The three-dimensional printing system of claim 9, wherein the UV light absorber is 2-(2H-benzotrizol-2-yl)-6-dodecyl-4methyl-phenol.

12. The three-dimensional printing system of claim 9, wherein the substituted cresol is present in an amount ranging from 0.3 to 5 weight percent of the UV fusing agent.

13. A method of printing a colorless three-dimensional object, the method comprising:

selectively applying an ultraviolet (UV) fusing agent onto a build material, wherein the UV fusing agent comprises water, a UV light absorber that is a substituted cresol, 10-50 weight percent (wt %) of a first solvent that is a plasticizing solvent, and 30-50 wt % of a second solvent that is water miscible and dissolves the UV light absorber; and heating the build material and the UV fusing agent that is selectively applied with a UV light to fuse a layer of the colorless three-dimensional object.

14. The method of claim 13, wherein the build material comprises a polymer, and wherein the first solvent in the UV fusing agent reduces a melting temperature of the polymer.

15. The method of claim 13, wherein the UV light absorber is 2-(2H-benzotrizol-2-yl)-6-dodecyl-4methyl-phenol, the first solvent is benzyl alcohol, and the second solvent is diethylene glycol (DEG) butyl ether.

\* \* \* \* \*